US008060679B2

(12) United States Patent
Nozaki et al.

(10) Patent No.: US 8,060,679 B2
(45) Date of Patent: Nov. 15, 2011

(54) INFORMATION PROCESSING APPARATUS AND ACCESS CONTROL METHOD CAPABLE OF HIGH-SPEED DATA ACCESS

(75) Inventors: Masaaki Nozaki, Santa Clara, CA (US); Tsutomu Horikawa, Kanagawa (JP); Kenichi Murata, Tokyo (JP)

(73) Assignee: Sony Corporation Entertainment Inc., Tokyo (JP)

( * ) Notice: Subject to any disclaimer, the term of this patent is extended or adjusted under 35 U.S.C. 154(b) by 0 days.

(21) Appl. No.: 11/760,853

(22) Filed: Jun. 11, 2007

(65) Prior Publication Data

US 2007/0294447 A1 Dec. 20, 2007

(30) Foreign Application Priority Data

Jun. 16, 2006 (JP) .................................. 2006-167641

(51) Int. Cl.
*G06F 12/00* (2006.01)
(52) U.S. Cl. ........................................ 710/240; 710/241
(58) Field of Classification Search .................. 710/113, 710/116, 240, 241; 370/230, 232, 234
See application file for complete search history.

(56) References Cited

U.S. PATENT DOCUMENTS

| 6,594,718 | B1 * | 7/2003 | Ebner et al. ................... 710/240 |
| 6,877,053 | B2 * | 4/2005 | Lahiri et al. ................... 710/113 |
| 6,944,172 | B2 * | 9/2005 | Sankey et al. .................. 370/412 |
| 6,950,395 | B1 * | 9/2005 | Bashandy et al. ......... 370/230.1 |
| 7,231,475 | B1 * | 6/2007 | Singla et al. ................... 710/117 |
| 7,382,727 | B2 * | 6/2008 | Yang .............................. 370/232 |
| 2001/0012272 | A1 * | 8/2001 | Aubert et al. .................. 370/230 |
| 2002/0114334 | A1 | 8/2002 | Yang |
| 2005/0138621 | A1 * | 6/2005 | Clark et al. .................... 718/100 |
| 2005/0157723 | A1 * | 7/2005 | Kim et al. ...................... 370/392 |
| 2005/0172084 | A1 | 8/2005 | Jeddeloh |
| 2005/0223124 | A1 | 10/2005 | Reed |
| 2007/0097864 | A1 * | 5/2007 | Bernstein ....................... 370/232 |
| 2007/0101033 | A1 * | 5/2007 | Chen et al. ..................... 710/241 |
| 2007/0115817 | A1 * | 5/2007 | Gupta et al. ................... 370/230 |

(Continued)

FOREIGN PATENT DOCUMENTS

EP 1241580 A 9/2002

OTHER PUBLICATIONS

Definition of "Virtual Machine" from Wikipedia, <http://en.wikipedia.org/wiki/Virtual_machine>, accessed on Mar. 23, 2009.*

(Continued)

*Primary Examiner* — Khanh Dang
(74) *Attorney, Agent, or Firm* — Matthew B. Dernier, Esq.; Gibson & Dernier LLP

(57) ABSTRACT

Requestors acquire tokens before issuing access requests to a memory controller. The access requests issued are accumulated in a command queue of the memory controller. When the amount of access requests accumulated in the command queue is smaller than or equal to a first threshold, or in level 0, tokens are generated at a rate equivalent to 200% of a bus bandwidth. If the amount of accumulation is greater than the first threshold and is smaller than or equal to a second threshold, i.e., in level 1, tokens are generated at a rate equivalent to the bus bandwidth. If the amount of accumulation exceeds the second threshold, the token generation is stopped.

14 Claims, 7 Drawing Sheets

U.S. PATENT DOCUMENTS

2007/0294448 A1* 12/2007 Nozaki et al. ............... 710/240
2008/0008094 A1* 1/2008 Gilfix ........................ 370/235
2008/0112313 A1* 5/2008 Terakawa ................... 370/229

OTHER PUBLICATIONS

U.S. Appl. No. 11/559,980, filed Nov. 15, 2006.
European Search Report for corresponding Patent Application 07252394.7.
Office Action for corresponding Japanese Application 200710110345.2 dated Jun. 21, 2010.

* cited by examiner

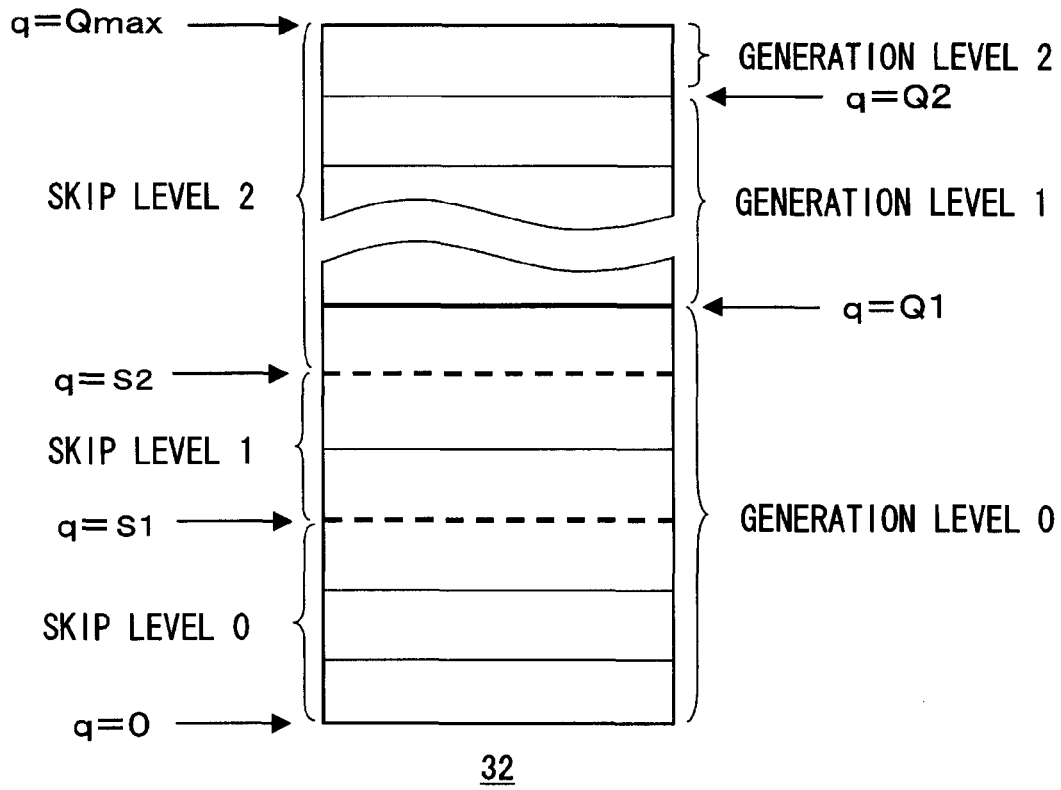

INFORMATION PROCESSING APPARATUS AND ACCESS CONTROL METHOD CAPABLE OF HIGH-SPEED DATA ACCESS

BACKGROUND OF THE INVENTION

1. Field of the Invention

The present invention relates to an information processing technology, and in particular, to an information processing apparatus which performs data transmission via a bus while processing a plurality of tasks in parallel, and an access control method thereof.

2. Description of the Related Art

With the significant progress of information processing technology in recent years, information processing apparatuses that perform high-speed operations are becoming increasingly common. As processors have improved in computing speed and the like, information processing apparatuses and electronic devices currently in the mainstream are capable of processing a plurality of applications or tasks in parallel. For parallel processing, it is typically the case that tasks are time-divided for the purpose of allocating the processing time of a processor. Virtual memory areas are also allocated to respective applications. The allocation of the processing time, memory capacity, and the like to a plurality of tasks is performed by an operating system (hereinafter, abbreviated as OS). The OS also exercises exclusive control, synchronous control, and the like over accesses among the processor, memory, and I/O devices when processing a plurality of tasks.

Now, the increase in the speed of processors and the introduction of virtual memory systems have made it possible to process a large volume of data at high speed, with an emerging problem in the efficiency of use of bus bandwidths intended for data transmission. Take, for example, the case of executing a plurality of applications including one to which real-time responses are essential, such as a game which displays three-dimensional moving graphics images. Even if the image processing is performed smoothly, a situation may occur in which the outputting of image data of the game is hindered because other applications are transmitting large volumes of data through a bus.

One of the approaches that has been proposed to solve this problem is a technique of granting permission to use the bus at higher frequencies to tasks of higher priority (for example, see U.S. Patent Application Publication No. US 2005/0138621). In this case, before issuance of data transmission requests, processing for acquiring issuance permission, called a "token," is performed. Since tokens are granted up to rates that are determined in advance for respective source units of data transmission requests, tasks of lower priority are provided with lower rates of data transfer so as to reduce their impact on other processing tasks.

In the meantime, demands for faster processing are ever increasing, creating a desire for technology that is capable of achieving high speeds at lower cost without an increase in implementation area. The inventors have recognized, however, that even with the foregoing technology for using bus bandwidths efficiently, for example, some latency can occur from the processing of granting tokens with a possible delay in processing time.

SUMMARY OF THE INVENTION

The present invention has been achieved in view of the foregoing problem. It is thus a general purpose of the present invention to provide a technology capable of using a bus adaptively and efficiently while processing a plurality of tasks.

One embodiment of the present invention relates to an information processing apparatus. This information processing apparatus includes: a plurality of requester units which ask for permission to issue an access request to a resource connected via a bus; an issuance rate control part which grants issuance permission to the requester units with control such that access requests are issued at a rate based on an implemented bus bandwidth B of the bus; and an access processing part which accepts and accumulates permitted access requests, and realizes sequential accesses. When an amount of the access requests accumulated in the access processing part is smaller than or equal to a predetermined first threshold, the issuance rate control part sets an upper limit for the rate of issuing access requests to a predetermined bus-bandwidth excess rate R which satisfies D×R>B, where B is the implemented bus bandwidth and D is the size of data to be transmitted through the bus with a single access request.

Here, the "requester units" and the "resource" may be ordinary hardware modules such as a processor, a memory, and an I/O device which are implemented in the information processing apparatus, or may be physical or virtual sections of the same or combinations of these. They may also be units of processing to be executed, such as a process, a task, or a thread, as long as they correspond to some units of processing that function as the sources or targets of accesses.

Another embodiment of the present invention also relates to an information processing apparatus. This information processing apparatus includes: a plurality of requester units which ask for permission to issue an access request to a resource connected via a bus; a token generator which generates tokens at a predetermined rate, and grants a generated token to a requester unit that asks for issuance permission with respect to each access request; and an access processing part which accepts and accumulates access requests issued from token-acquired requester units, and realizes sequential accesses. When an amount of the access requests accumulated in the access processing part is smaller than or equal to a predetermined threshold, the token generator generates tokens at a rate above an implemented bus bandwidth of the bus.

Yet another embodiment of the present invention relates to an access control method. This access control method includes: allocating a bus bandwidth to a plurality of requestor units which issue access requests to a resource connected via a bus; accumulating the access requests issued by the requestor units within respective bus bandwidths allocated thereto; and sequentially realizing the accumulated access requests. The allocating includes allocating so that a total sum of the bus bandwidths allocated to the plurality of requestor units exceeds an implemented bus bandwidth of the bus when an amount of the accumulated access requests is smaller than or equal to a predetermined threshold.

Yet another embodiment of the present invention relates to a computer-readable recording medium. The computer-readable recording medium includes a computer program product causing the computer to perform the steps, including: exercising control so that access requests to a resource connected via a bus are issued from a requestor unit at a rate based on an implemented bus bandwidth B of the bus; accepting and accumulating the access requests issued; and sequentially realizing the accumulated access requests, wherein when an amount of the access requests accumulated is smaller than or equal to a predetermined value, control is exercised so that the access requests are issued even when the issuance rate R exceeds a bus-bandwidth equivalent rate R1 which satisfies: D×R1=B, where B is the implemented bus bandwidth and D is the size of data to be transmitted through the bus by a single access request.

Any combinations of the foregoing components, and any conversions of expressions of the present invention between methods, apparatuses, systems, computer programs, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a diagram for explaining levels to be set for the amount of access requests accumulated in the command queue according to a second embodiment;

FIG. 6 is a table showing rules for skipping token granting processing depending on the priorities of requesters and skip levels according to the second embodiment;

DETAILED DESCRIPTION OF THE INVENTION

First Embodiment

Figure 1:
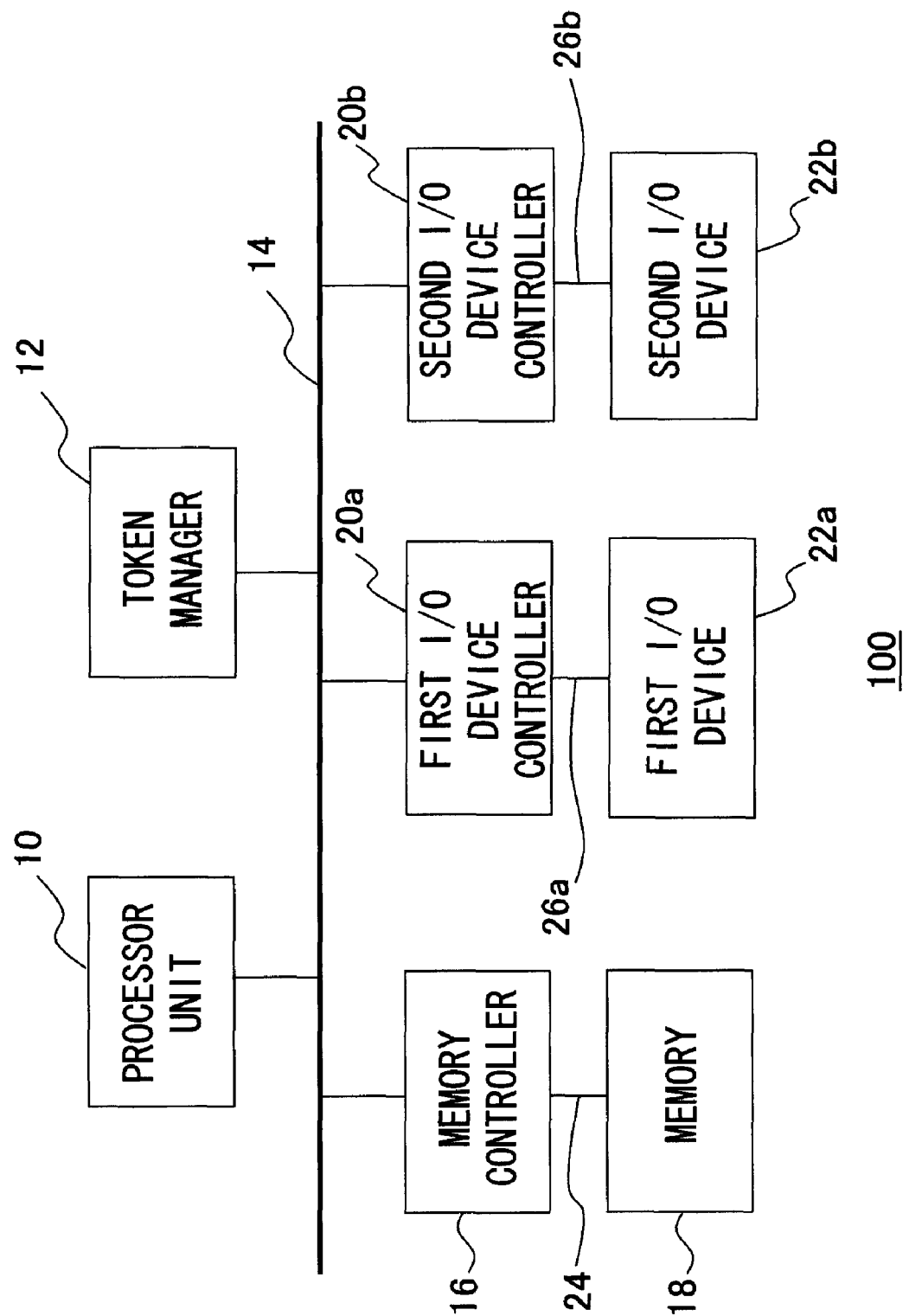
FIG. 1 is a diagram showing the configuration of an information processing apparatus according to a first embodiment.

FIG. 1 shows the configuration of an information processing apparatus according to the present embodiment. The information processing apparatus 100 includes a processor unit 10, a token manager 12, a memory controller 16, a memory 18, a first I/O device controller 20a, a second I/O device controller 20b, a first I/O device 22a, and a second I/O device 22b. The processor unit 10 executes loaded applications and an OS. The memory 18 stores running programs and data necessary for execution. For example, memory 18 may act as a computer-readable recording medium having a computer program product stored thereon for execution. The memory controller 16 controls accesses to the memory 18. The first I/O device 22a and the second I/O device 22b accept user inputs, and perform data output etc. The first I/O device controller 20a and the second I/O device controller 20b control access to the first I/O device 22a and the second I/O device 22b, respectively. The token manager 12 manages tokens corresponding to access requests to the memory 18, the first I/O device 22a, and the second I/O device 22b. Tokens will be detailed later.

The processor unit 10, the memory 18, the first I/O device 22a, and the second I/O device 22b transmit data therebetween via a bus 14. In fact, dedicated buses may be provided for data transmission lines between the individual units, or outgoing and incoming lines of data, respectively. For the purpose of simplicity, they will be represented by a single line. Bus bandwidths of the bus 14 available for data transmissions between the units are individually determined in advance by simulation or the like. The values may be selected as appropriate from among a plurality of settings depending on such factors as the connection statuses of the units. It should be noted that in the present embodiment, the modes of connection between the units and the bus 14 are not limited to those shown in FIG. 1. It is desirable, however, that the individual units are capable of the functions to be described herein.

The first I/O device 22a and the second I/O device 22b may be any one of input devices such as a keyboard and a mouse, drives of recording media such as a hard disk, a digital versatile disk (DVD), and a compact disk (CD), display units, printers, various types of processor units such as a graphic processor, bridge chips, network chips, and the like, or combinations of these. The number of I/O devices is therefore not limited in particular. In FIG. 1 and the following description, those I/O devices will be typified by the first I/O device 22a and the second I/O device 22b for the sake of simplicity. Similarly, the I/O device controllers corresponding to the respective I/O devices will be typified by the first I/O device controller 20a and the second I/O device controller 20b.

The processor unit 10 according to the present embodiment processes a plurality of tasks in parallel. Each task is time-divided, and the processing time of the processor unit 10 is allocated thereto for sequential processing. The processor unit 10 may be composed of a plurality of processors (not shown) In such cases, for example, one of the plurality of processors serves as a control processor to control scheduling and switching of task processing by the other processors.

The first I/O device controller 20a accepts access requests from the processor unit 10 and from the other I/O device controllers, i.e., the second I/O device controller 20b. It then conducts data transmission and reception of the corresponding first I/O device 22a to/from the processor unit 10 and the other I/O devices, i.e., the second I/O device 22b. The first I/O device controller 20a also issues access requests from the corresponding first I/O device 22a to the memory 18 and the other I/O devices, i.e., the second I/O device 22b. When accesses are established, data are transmitted and received via a bus 26a which is connected to the first I/O device 22a.

The second I/O device controller 20b accepts access requests from the processor unit 10 and the other I/O device controllers, i.e., the first I/O device controller 20a. It then conducts data transmission and reception of the corresponding second I/O device 22b to/from the processor unit 10 and the other I/O devices, i.e., the first I/O device 22a. The second I/O device controller 20b also issues access requests from the corresponding second I/O device 22b to the memory 18 and the other I/O devices, i.e., the first I/O device 22a. When accesses are established, data are transmitted and received via a bus 26b which is connected to the second I/O device 22b.

The memory 18 may be of commonly used types such as a dynamic random access memory (DRAM) and a static random access memory (SRAM). The memory controller 16 accepts access requests to the memory 18 from the processor unit 10, the first I/O device controller 20a, and the second I/O device controller 20b, and conducts data transmission and reception of the memory 18 to/from the processor unit 10, the first I/O device 22a, and the second I/O device 22b. The data are transmitted and received via a bus 24 which is connected to the memory 18.

The token manager 12 determines whether or not to permit the issuance of the following: access requests from the processor unit 10 to the memory 18, the first I/O device 22a, and the second I/O device 22b; access requests from the first I/O device controller 20a to the memory 18 and the second I/O device 22b; and access requests from the second I/O device controller 20b to the memory 18 and the first I/O device 22a. In this case, the access requests are made in units of a predetermined write/read data size. That is, data to be read from or written to the target memory 18, first I/O device 22a, and second I/O device 22b are transmitted to the respective connected buses, i.e., the buses 24, 26a, and 26b as packets of the same size.

Since the size of data to be transmitted with each single access request is identical, the maximum rates for permitting access requests can be adjusted to limit the bus bandwidths available for the sources of access requests. If the maximum rates are individually adjusted so that the total sum of the maximum bus bandwidths available for the respective sources of access requests does not exceeds the bus bandwidths of the data-transmitting buses, it is possible for all the sources of access requests to share the bus bandwidths in desirable proportions.

In view of this, the token manager 12 sets the maximum rates for permitting access requests via the respective buses in advance, with respect to each of the sources of access requests. The limitations on the bus bandwidths are materialized as tokens to be generated at the maximum rates, and sources that have acquired tokens alone are permitted to issue access requests. If the implemented bus bandwidths differ from one access target to another, the rates of generation of tokens corresponding to the bus bandwidths are set with respect to each access target.

This consequently reduces such situations in which accesses to the memory 18, the first I/O device 22a, and the second I/O device 22b from tasks that require real-time responses are hindered because the bus bandwidths are occupied by tasks of lower priority.

Figure 2:
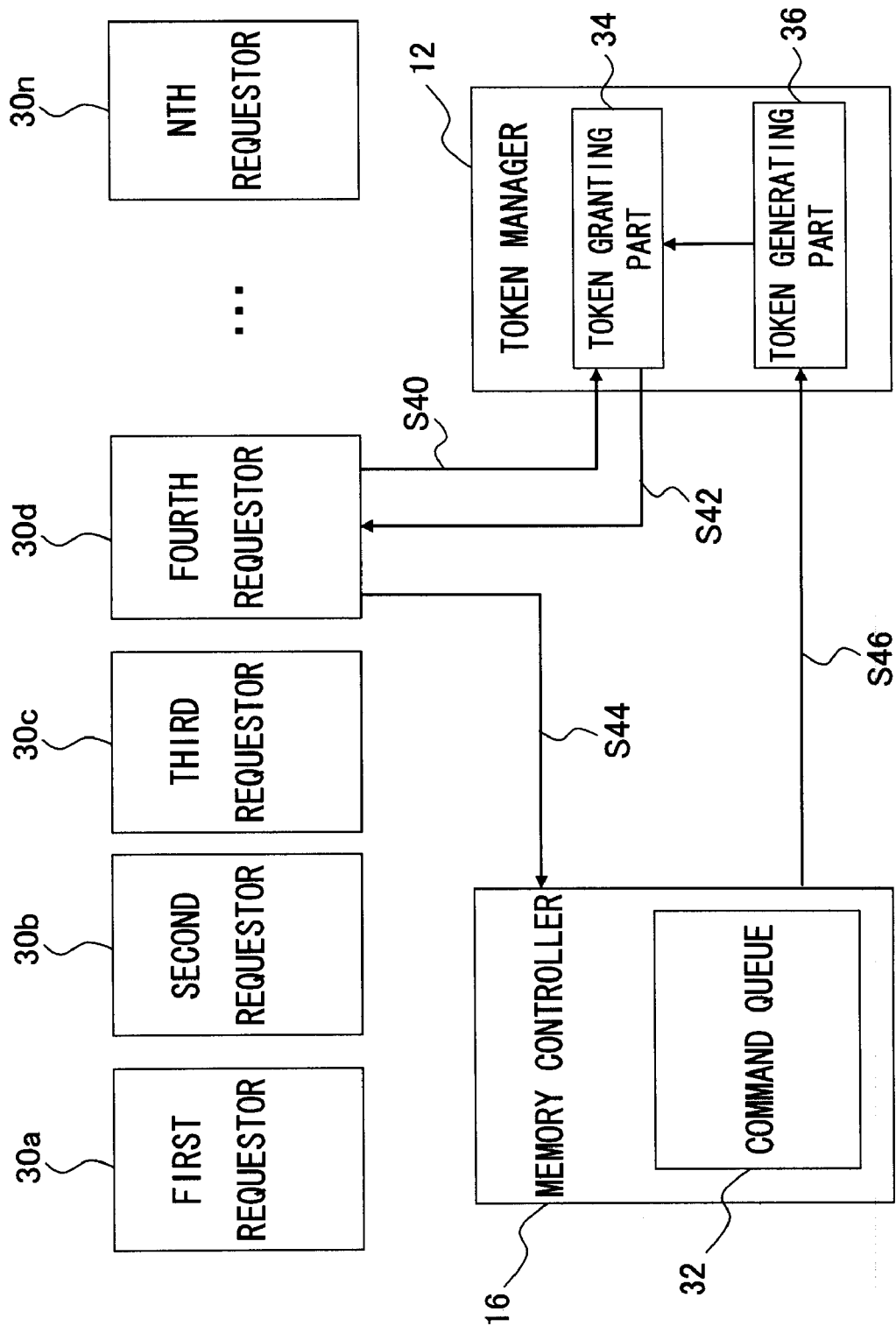
FIG. 2 is a diagram for explaining the procedure of processing of a token manager and a memory controller pertaining to access requests to a memory according to the first embodiment.

Now, the processing of the token manager 12 will be described in more detail. FIG. 2 is a diagram showing the procedure of processing of the token manger 12 and the memory controller 16, pertaining to access requests to the memory 18 from the processor unit 10, the first I/O device controller 20a, or the second I/O device controller 20b. For the sake of explaining access requests to the memory 18, the diagram only shows the memory controller 16. In the cases of access requests to the first I/O device 22a or the second I/O device 22b, the first I/O device controller 20a or the second I/O device controller 20b will perform the same processing instead of the memory controller 16. Similarly, for ease of understanding, the following description deals with the memory controller 16. The memory controller 16 may be replaced, however, with the first I/O device controller 20a or the second I/O device controller 20b. Thus, while the use of bus bandwidth of the bus 24 which is connected to the memory 18 is subjected to control in the following description, it may also be replaced with that of the bus 26a which is connected to the first I/O device 22a or that of the bus 26b which is connected to the second I/O device 22b as appropriate.

In FIG. 2, the individual elements shown as functional blocks for performing various types of processing can be constituted, in terms of hardware, by a CPU, memory, and other LSIs. In terms of software, they can be achieved by a program (e.g., a computer program product stored on a computer-readable recording medium) and the like for realizing data transmission and reception between elements. It will thus be understood by those skilled in the art that these functional blocks may be achieved in various forms including hardware alone, software alone, and combinations of these, and are not limited to any one of them.

For example, a first requester 30a to an nth requester 30n, i.e., n requesters, may be associated with processors included in the processor unit 10 as well as the first I/O device controller 20a and the second I/O device controller 20b. They may also be associated with virtual sections of a processor or the like which are allocated to respective processes or tasks to be processed by the information processing apparatus 100. In any case, the first requester 30a to the nth requester 30n are unit elements that can serve as sources for issuing access requests to the memory 18.

The token manager 12 includes a token granting part 34 and a token generating part 36. The token generating part 36 generates tokens at predetermined rates. The token granting part 34 grants generated tokens to each of the first to nth requesters 30n that ask for permission to issue access requests. The rates at which the token generating part 36 generates tokens vary from one requester to another. In another approach, the first requester 30a to the nth requester 30n may be grouped depending on their significance, processing modes, or other factors so that the generation rates are adjusted group by group. Suppose, for example, that the first requester 30a and the second requester 30b perform graphic processing and the third requester 30c, the fourth requester 30d, and others perform document processing with uneven distributions of access targets or at characteristic access frequencies. In such situations, the group setting of appropriate generation rates allows more efficient use of resources.

In the former approach, dedicated tokens are generated for the first requester 30a to the nth requester 30n at respective rates. In the latter approach, dedicated tokens are generated group by group at respective rates, and requesters belonging to the same group, such as the first requester 30a and the second requester 30b, share the tokens. It should therefore be understood that the first requester 30a to the nth requester 30n may be replaced with requester groups in the following description. The correspondence between the requesters and the token generation rates is determined and stored into a register (not shown) of the token manager 12 in advance. The generation rates can be determined by experiment or simulation in view of the characteristics, significance, and other factors relating to the requesters.

The token generating part 36 retains generated tokens until the next generation cycle occurs. If any of the first to nth requesters 30a to 30n issue requests in the meantime, the token granting part 34 grants tokens to the source requesters. If there is no request, the retained tokens are discarded and new tokens are generated when the next generation cycle occurs. Depending on the situations, the excessive tokens may be transferred to other requesters that lacks tokens.

The memory controller 16 includes a command queue 32 into which access requests to the memory 18 are accumulated when issued by token-granted requesters. The memory controller 16 sequentially processes the requests that are accumulated in the command queue 32, thereby performing access processing between the memory 18 and the source requesters, i.e., data transmission through the buses 14 and 24.

Next, the procedure for realizing access processing will be described in conjunction with the example shown in FIG. 2. Suppose that out of the first requester 30a to the nth requester 30n the fourth requester 30d initially comes to require an access to the memory 18. To begin, the fourth requester 30d notifies the token manager 12 of the intention to issue an access request, thereby asking for a token (S40). This notification includes information for identifying the first requester 30a to the nth requester 30n.

Based on the identification information regarding the requesters, the token granting part 34 checks whether there is any token that can be granted to the fourth requester 30d. If any, the token granting unit 34 grants the token to the requesting source, i.e., fourth requester 30d (S42). In this case, if all the tokens available for the fourth requester 30d or all the tokens available for the group to which the fourth requester 30d belongs have already been used by other requests within the single cycle of token generation, the granting processing is postponed until the token generating unit 36 next generates tokens.

Only if a token is acquired, the fourth requester 30d can issue an access request on the memory 18 to the memory controller 16 (S44). The access request includes a read or a write command, necessary address information, and so on. The memory controller 16 accepts the access request, and accumulates it into the command queue 32. The memory controller 16 then executes access processing sequentially from the access requests accumulated first.

In the foregoing processing, for example, the fourth requester 30d can actually issue access requests only at a predetermined rate or below even if it attempts to access the memory 18 consecutively. This can suppress such situations in which high-priority processing to be performed by other requesters is hindered.

In the meantime, however, the introduction of tokens can cause another overhead. For example, in the foregoing procedure, the internal processing of the token manager 12 produces latency while the token manager 12 accepts a token request from the fourth requester 30d and grants a token thereto even if there are tokens available. The fourth requester 30d also produces an internal latency due to the processing required for requesting a token.

In addition, if a plurality of requesters or requesters belonging to different groups acquire respective tokens and issue access requests for the same memory 18 to the memory controller 16 at almost the same time, then the memory controller 16 produces latencies in order to accept those requests in succession.

Therefore, in the present embodiment, the rates of generation of tokens are changed in accordance with the number of access requests accumulated in the command queue 32. For this purpose, information regarding the amount of accumulation is transmitted from the memory controller 16 to the token manager 12 (S46). Specifically, when the amount of accumulation is small, tokens are generated at rates above the implemented bus bandwidths, such as 200% or higher, so that excessive tokens may be acquired by any requesters. This makes it possible to suppress the overhead of access processing ascribable to the processing for granting tokens and accepting access requests.

Figure 3:
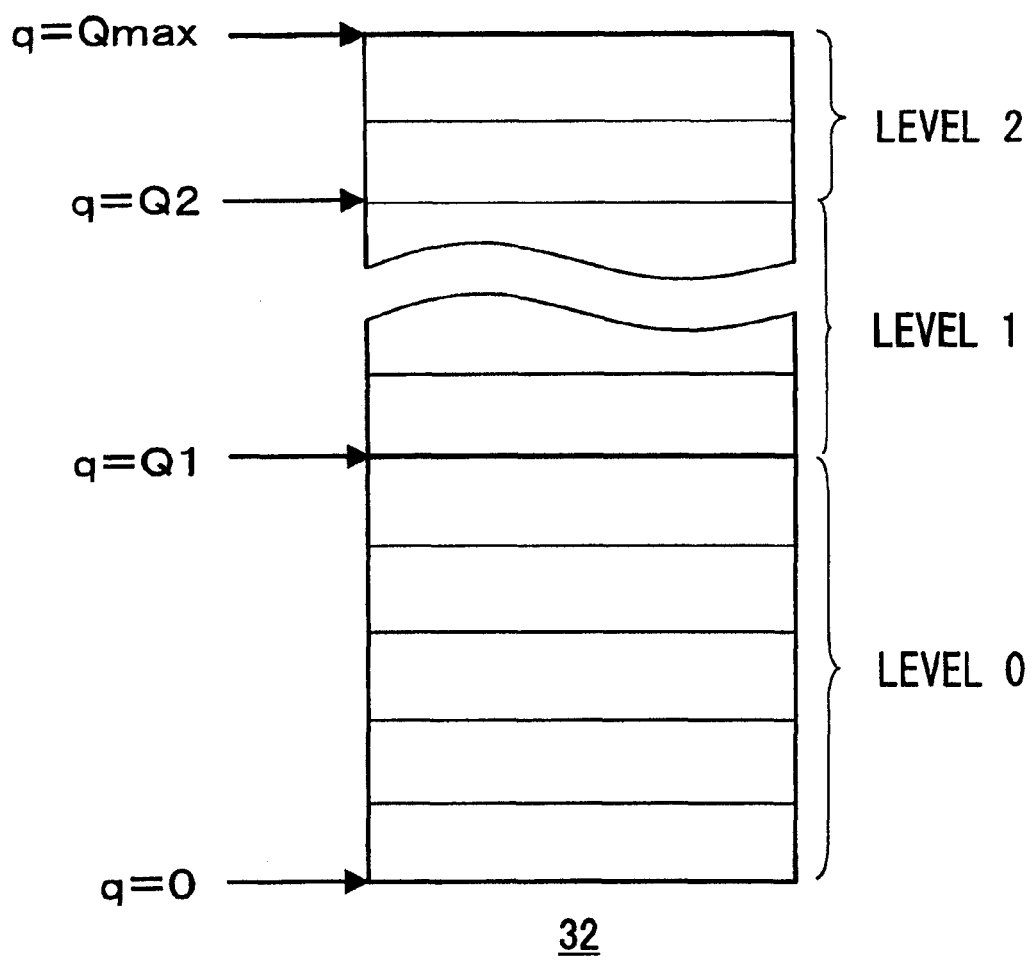
FIG. 3 is a diagram for explaining levels to be set for the amount of access requests accumulated in a command queue according to the first embodiment.

FIG. 3 is a diagram explaining the levels to be set for the amount of access requests accumulated in the command queue 32. In the diagram, the amount q of access requests accumulated in the command queue 32 is expressed such that: q=0 at the bottom, i.e., when no access request is accumulated; and q=Qmax at the top, i.e., when the maximum possible amount of access requests are accumulated in the command queue 32. Then, two thresholds q=Q1 and q=Q2 are set as shown in the diagram (0<Q1<Q2<Qmax). In the following description, the range where the amount of accumulation q satisfies $0 \leq q \leq Q1$ will be referred to as "level 0," the range where $Q1 < q \leq Q2$ as "level 1," and the range where $Q2 < q \leq Qmax$ as "level 2."

Suppose that the rates of generation of tokens (the numbers of tokens to be generated per unit time) for the first requester 30a, the second requester 30b, ..., the nth requester 30n are R1, R2, ..., Rn (tokens/second). The generation rates are set so that a bus bandwidth to be used when the first requester 30a to the nth requester 30n make maximum accesses is equal to the implemented bus bandwidth B (bytes/second). That is, the generation rates R1, R2, ..., Rn are set to satisfy:

$$(R1+R2+\ldots+Rn) \times D = B, \quad \text{(Eq. 1)}$$

where D is the size (bytes/token) of data to be transmitted with a single access.

At level 0, tokens are generated at a rate above the implemented bus bandwidth as mentioned above. More specifically, tokens are generated at a rate R that satisfies:

$$R \times D > B, \quad \text{(Eq. 2)}$$

where R is the total sum (tokens/second) of the generation rates of all the tokens for all the requestors 30a-30n at level 0 such that R exceeds (R1+R2+...+Rn). For example, assuming a rate of 200% of the bus bandwidth, R=2B/D. Here, unassigned tokens generated at the excess generation rate of Ro (tokens/second) wherein $$Ro = R - (R1+R2+\ldots+Rn) \quad \text{(Eq. 3)}$$

will be granted to any requestor that requests tokens.

This increases the chances of eliminating wait time before the generation of requested tokens, thereby reducing the time necessary from token requests to granting on the whole. Consequently, in a situation where the amount of access requests accumulated in the command queue 32 is small and the access processing is more likely to produce overhead ascribable to the processing of granting tokens and the processing of accepting access requests, it is possible to perform the token granting processing more quickly. Since the rates at which access requests are issued increase temporarily, it is also possible to end the situation itself where the amount of accumulation is small.

Level 1 does not involve the generation of unassigned tokens. Tokens for the first requester 30a to the nth requester 30n are generated at respective rates such as shown in equation 1. The first requester 30a to the nth requester 30n can thus secure bus bandwidths in appropriate proportions, thereby precluding a significant delay in access processing due to insufficient bus bandwidths. Since the command queue 32 accumulates access requests more slowly than in level 0, it is possible to suppress the possibility that the amount of accumulation q reaches q=Qmax and the memory controller 16 cannot accept any further access requests. When the memory controller 16 can no longer accept access requests, the first requester 30a to the nth requester 30n may need to spend additional time reissuing the access requests, with a significant delay in the execution of the accesses.

At level 2, the generation of all the tokens is stopped. As a result, access requests cannot be issued by requesters other than those that have already acquired tokens at that point. This reduces the possibility that access requests once issued are rejected and the requesters must reissue the access requests, thereby suppressing the occurrence of the foregoing latencies.

Figure 4:
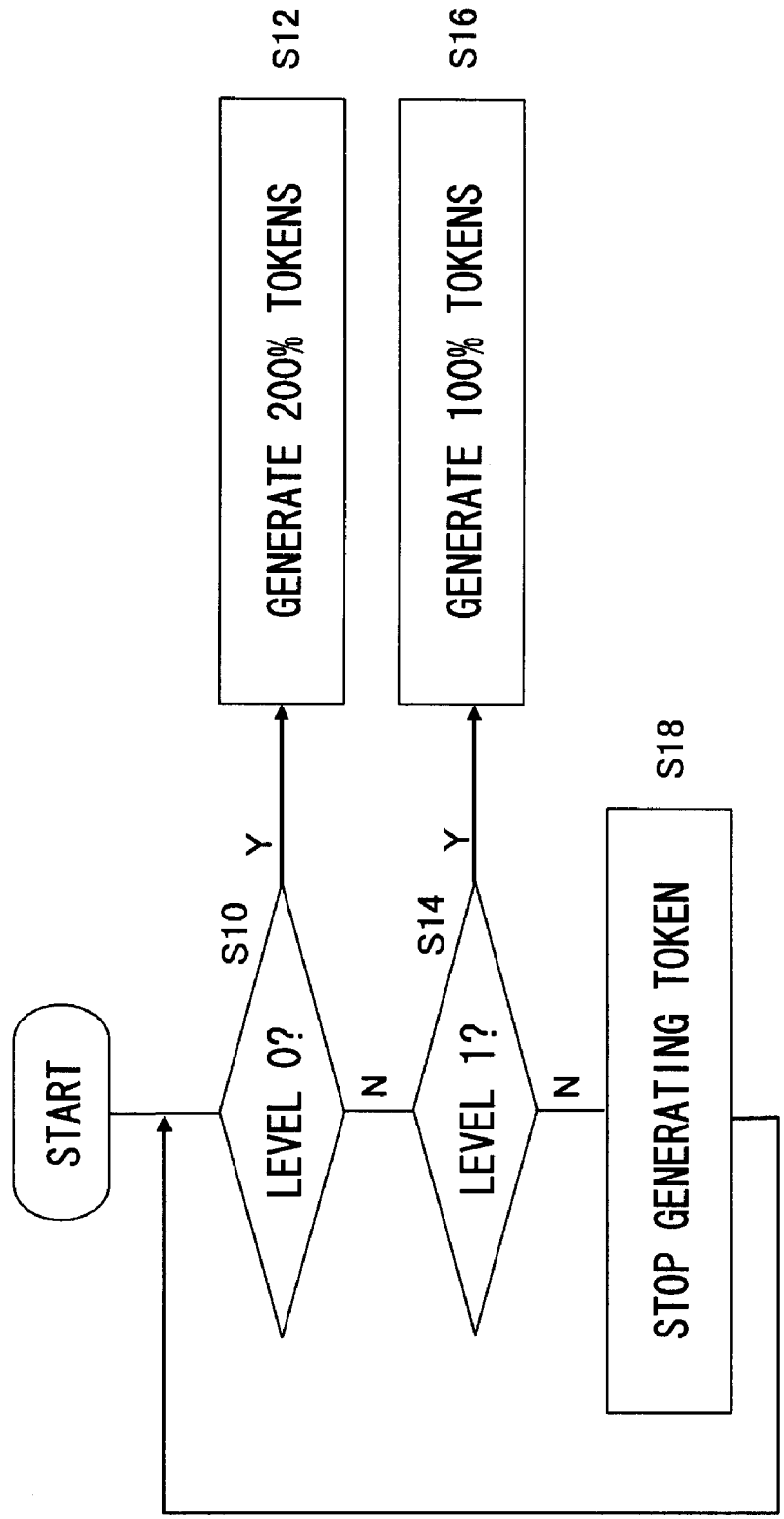
FIG. 4 is a diagram showing an example of a token generation scheme to be executed by a token generating part according to the first embodiment.

FIG. 4 shows an example of a token generation scheme to be performed by the token generating part 36 of the token manager 12, based on the structure of the command queue 32 shown in FIG. 3. Initially, when the amount of accumulation in the command queue 32 exceeds any of the borders between levels 0, 1, and 2, the memory controller 16 transmits a notification signal thereof to the token manager 12 as shown by S46 of FIG. 2. Based on the notification signal, the token manager 12 writes the current level of the amount of accumulation in the command queue 32 into an internal register (not shown).

Subsequently, the token generating part 36 checks the register at each cycle of token generation. If the register value indicates level 0 (Y at S10), tokens are generated at the rate corresponding to 200% of the implemented bus bandwidth, including unassigned tokens (S12). More specifically, tokens are generated for the first requester 30a through the nth requester at a rate corresponding to 100% of the implemented bus bandwidth. Unassigned tokens are also generated at a rate corresponding to 100% of the bus bandwidth. It should be noted that these proportions are given by way of illustration. It is only necessary that the tokens be generated at above the rate equivalent to the implemented bus bandwidth in total. For the rate of generation of all tokens and the proportion of the unassigned tokens to all tokens, optimum values are determined as appropriate by experiment, simulation, or the like based on such factors as the capacity of the command queue 32 and the speed at which access requests are accumulated.

If the register value indicates level 1 (Y at S14), the generation of unassigned tokens is stopped. Tokens are generated only for the first requester 30a to the nth requester 30n at a rate corresponding to 100% of the implemented bus bandwidth in total (S16).

If the register value indicates neither level 0 nor level 1 (N at S10, N at S14), i.e., if the register value indicates level 2, the generation of all tokens is stopped (S18)

While the explanation of FIG. 4 has dealt with a case where the present embodiment is practiced by the operation of the token generating part 36, the same control may be achieved by the operation of the token granting part 34. To be more specific, the token generating part 36 generates tokens including unassigned tokens at a rate corresponding to 200% of the implemented bus bandwidth all the time. Then, the token granting part 34 checks the register value when it accepts token requests from requesters. At level 0, unassigned tokens are granted to requesters if there is no dedicated token available to the source requesters. At level 1, unassigned tokens will not be granted. At level 2, the granting of tokens is stopped.

As has been described, according to the present embodiment, thresholds are set for the amount of accumulation of access requests to the memory controller 16, the first I/O device controller 20a, and the second I/O device controller 20b in the command queue. If the amount of accumulation falls within the range between 0 and a certain threshold, i.e., when the amount of accumulation is small, tokens are generated at a rate such that the maximum use bus bandwidth exceeds the implemented bus bandwidth. This reduces the time required for granting tokens, and increases the speed of accumulation of access requests in the command queue 32. It is therefore possible to absorb latencies that occur when the memory controller 16, the first I/O device controller 20a, or the second I/O device controller 20b accepts a number of access requests concurrently. As a result, it is possible to suppress overhead that occur due to the processing of granting tokens and accepting of access requests when accessing the memory 18, the first I/O device 22a, or the second I/O device 22b.

If the amount of accumulation greatly exceeds the foregoing threshold, tokens are generated at rates equivalent to the implemented bus bandwidth, and are assigned to the respective requesters. Consequently, even if a latency occurs from the processing of granting tokens or the acceptance of access requests, the access requests to be processed in the meantime by the memory controller 16, the first I/O device controller 20a, and the second I/O device controller 20b are accumulated into the command queue 32. It is therefore possible to allocate appropriate bus bandwidths without increasing overhead.

Moreover, the present embodiment can be achieved only by adding a new setting to the OS. Unlike hardware-based approaches such as introducing a new circuit or enhancing the bus bandwidths, the present embodiment can be practiced for all purposes at low cost without affecting the implementation area.

Second Embodiment

In the first embodiment, the rates of generation of tokens or the rates of granting of tokens are lowered stepwise from values exceeding the implemented bus bandwidths, in accordance with the amount of access requests accumulated in the command queue 32. In the present embodiment, the processing of granting tokens will sometimes be skipped to suppress the occurrence of overhead when the amount of access requests accumulated in the command queue 32 is small. The present embodiment can be practiced by the same configuration as that of the information processing apparatus 100 shown in FIG. 1 and with the same procedure as the access processing procedure described with reference to FIG. 2. Hereinafter, the description will deal mainly with differences from the first embodiment.

Tokens are introduced in order to arbitrate the use rates of the bus bandwidths in view of the characteristics, priorities, and other factors of the first requester 30a to the nth requester 30n. Tokens are therefore effective when access requests from the requesters concentrate and the bus bandwidths tend to be short. The inventors has found that when the amount of access requests accumulated in the command queue 32 is small, on the other hand, the individual accesses are likely to be processed smoothly without the strict token-based arbitration of the use of the bus bandwidths.

Then, in addition to the mode of level classification for setting the token generation rates described in the first embodiment, another mode of level classification for skipping the process of granting tokens is introduced. In addition, requesters are given respective priorities, and the number of requesters for which the token granting processing may be skipped is changed based on the newly-introduced levels.

FIG. 5 is a diagram showing the levels to be set for the amount of access requests accumulated in the command queue 32 according to the present embodiment. As in the first embodiment, thresholds Q1 and Q2 are set on the amount q of access requests accumulated. The operation of the token manager 12 is also changed with these thresholds as in the first embodiment. In the following description, the range where the amount of accumulation q satisfies $0 \leq q \leq Q1$ will be referred to as "generation level 0," the range where $Q1 < q \leq Q2$ as "generation level 1," and the range where $Q2 < q \leq Qmax$ as "level 2" for the sake of convenience.

The present embodiment also establishes thresholds S1 and S2 ($0 < S1 < S2 < Q1$) on the amount q of access requests accumulated. In the following description, the range where the amount of accumulation q satisfies $0 \leq q \leq S1$ will be referred to as "skip level 0," the range where $S1 < q \leq S2$ as "skip level 1," and the range where $S2 < q \leq Qmax$ as "skip level 2." As is evident from the diagram, according to the present embodiment, the amount of access requests accumulated is expressed in two level scales, i.e., skip levels and generation levels.

In FIG. 5, both the thresholds S1 and S2, i.e., the borders between the skip levels fall within generation level 0. In this range, even if the skip level varies, the token generating part 36 will generate unassigned tokens and requestor-specific tokens at a predetermined rate R above the bus bandwidth, shown by equation 2, as in the case of level 0 in the first embodiment. The following description will therefore deal only with how the operation of the information processing apparatus 100 changes with variations in skip level. It should be noted, however, that the borders of the skip levels are not limited to being within generation level 0. The changes of operation based on the skip levels and the changes of operation based on the generation levels may be combined in an arbitrary fashion.

FIG. 6 shows a table of rules for skipping the token granting processing depending on the priorities given to the respective first to nth requesters 30a to 30n and the given skip levels. In the following description, requesters for which the token granting processing can be skipped will be granted a free pass (hereinafter, referred to as FP) instead of a token. The FP granting rule table 50 includes a priority field 52 which shows the priorities given to the requesters, and a skip level field 54 which shows skip levels. This table can be consulted to determine uniquely whether to grant an FP to a requester or to disable the skipping in each skip level. The FP granting rule table 50 is stored in a register (not shown) of the token manager 12, the memory 18, or the like.

In the diagram, priorities 2 to 0 are set in the priority field 52. In this case, priority 2 represents a highest priority, and priority 0 a lowest priority. Requestors of highest priority are granted an FP in a wide range of skip level 0 and skip level 1. When requesters are granted an FP, they can skip the token acquisition and issue access requests to the memory controller 16, the first I/O device controller 20a, and the second I/O device controller 20b. Requestors of lowest priority, on the other hand, are given no FP in any case, and thus issue access requests only when they acquire tokens. Requestors of intermediate priority are given an FP in a range narrower than those with highest priority, such as in skip level 0 only.

In this case, the first requestor 30a to the nth requestor 30n may be provided with respective priorities. If the token generation rates are determined for respective groups of requestors, priorities may also be set group by group. The priorities are determined by experiment or simulation in view of the significance, processing characteristics, and other factors of the first requestor 30a to the nth requestor 30n or groups thereof, and are stored in a register (not shown) within the token manager 12. Alternatively, the priorities may be set into internal registers of the first requestor 30a to the nth requestor 30n, or within a program (e.g., a computer program product stored on a computer-readable recording medium).

"Granting an FP" my be performed by the following manner. When the amount of accumulation of the command queue 32 exceeds any of the borders between skip levels 0, 1, and 2, the memory controller 16, the first I/O device controller 20a, or the second I/O device controller 20b transmits a notification signal thereof to the token manager 12 as shown by S46 in FIG. 2 of the first embodiment. Based on the notification signal, the token manager 12 writes the current skip level into an internal register (not shown).

The token manager 12 also consults the FP granting rule table 50 based on the skip level, and determines whether to grant an FP or disable the same with respect to each requester. When granting an FP, the token manager 12 sets flags on the memory 18 corresponding to respective requesters, or flags provided in the registers of the respective requesters, to a value such as "1." When disabling an FP, the flags are reset to a value such as "0." Alternatively, the first requester 30a to the nth requester 30n may check the current skip level and the FP granting rule table 50 to rewrite their own flags when making access requests or the like.

Figure 7:
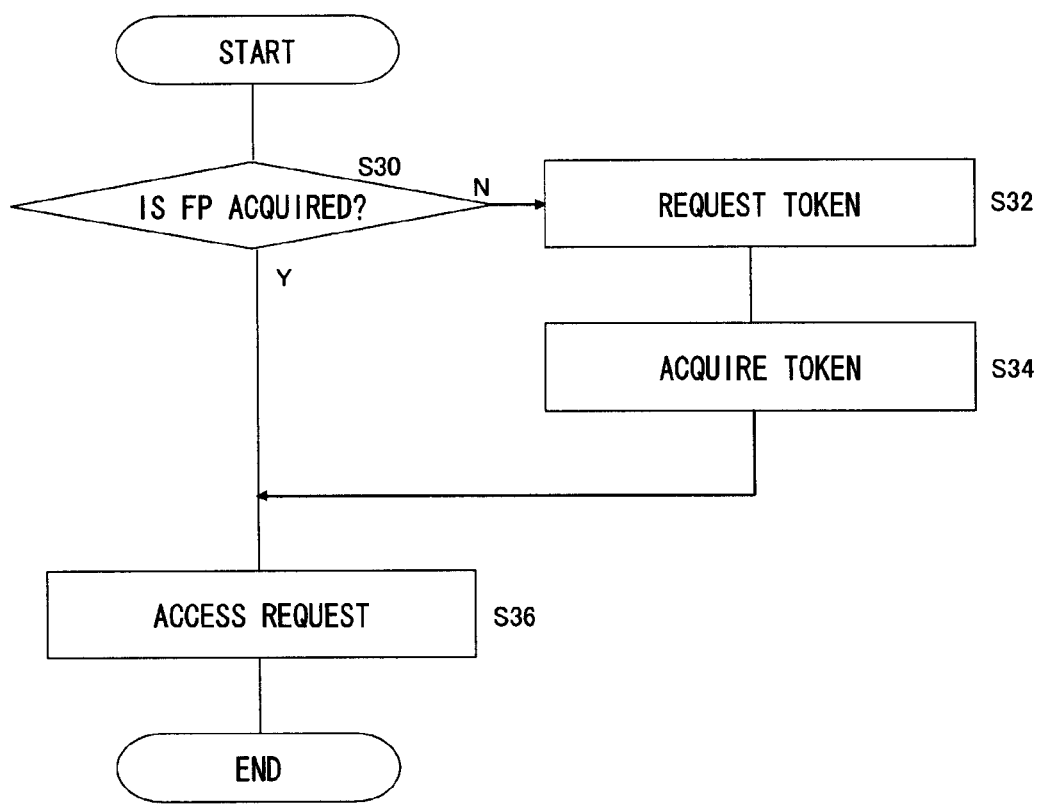
FIG. 7 is a flowchart showing an access request issuing procedure to be executed by requesters according to the second embodiment.

FIG. 7 shows an access request issuing procedure to be performed by the first requester 30a to the nth requester 30n in the present embodiment. Initially, suppose that it becomes necessary to access the memory 18, the first I/O device 22a, or the second I/O device 22b. The first requester 30a to the nth requester 30n check whether they have their own FP (S30). As described previously, this processing actually involves checking whether the flags provided in the memory 18 or the like are set to "1" or "0." If an FP is acquired (Y at S30), the requesters issue access requests to the memory controller 16, the first I/O device controller 20a, or the second I/O device controller 20b directly (S36).

If an FP is not acquired (N at S30), the requesters ask for tokens from the token manager 12 as described in the first embodiment (S32). The token manager 12 then performs necessary processing as to the generation and granting of tokens. When tokens are acquired (S34), the source requesters issue access requests to the memory controller 16, the first I/O device controller 20a, or the second I/O device controller 20b (S36).

Figure 8:
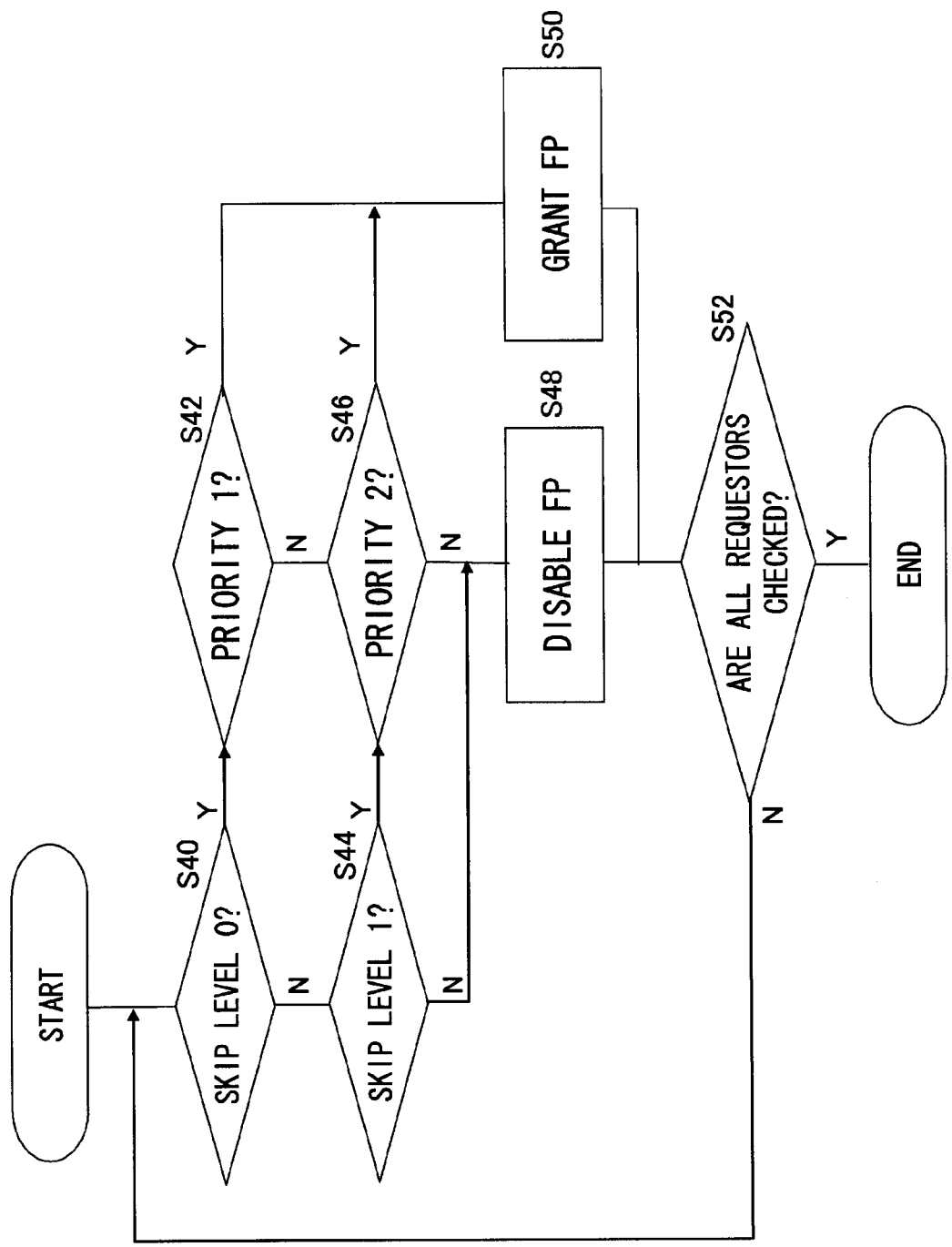
FIG. 8 is a flowchart showing an example of the scheme in which the token manager grants FP to the requesters sequentially according to the second embodiment.

FIG. 8 shows an example of the scheme in which the token manager 12 successively grants FP to the first requester 30a to the nth requester 30n in the present embodiment. When the token manager 12 receives a signal notifying of a change in skip level from the memory controller 16, the first I/O device controller 20a, or the second I/O device controller 20b, it checks for the skip level from this notification signal or the value of a register to which the information is once written. If the skip level is 0 (Y at S40), the token manager 12 then checks the priority of the requester to which to grant an FP.

If the priority is 1 (Y at S42) or 2 (N at S42, Y at S46), an FP is granted based on the FP granting rule table 50 of FIG. 6 (S50). As described above, an FP is granted by setting the flag of the target requester. If the priority level is 0 (N at S46), the FP is disabled and the flag is reset based on the FP granting rule table 50 (S48).

Similarly, if the skip level is 1 (N at S40, Y at S44) and the priority level is 2 (Y at S46), an FP is granted (S50). In the other cases (Y at s44 and N at S46; N at S44), the FP is disabled (S48). The foregoing processing is performed on all the requesters, i.e., the first requester 30a to the nth requester 30n (Y at S52), thereby updating whether to grant or disable an FP.

As has been described, according to the present embodiment, two threshold scales are provided as to the amount of accumulation of access requests to the memory controller 16, the first I/O device controller 20a, and the second I/O device controller 20b in the command queue 32. The thresholds on the first scale are intended to change the rates of generation of tokens as in the first embodiment. The thresholds on the second scale are intended to skip the processing of acquiring tokens. Since the first scale provides the mode of generating tokens at a rate above the bus bandwidth, it is possible to reduce latencies during the processing of granting tokens as described in the first embodiment. Moreover, upon concentration of access requests, latencies that occur from the accepting processing of the memory controller 16, the first I/O device controller 20a, or the second I/O device controller 20b can be absorbed by maintaining access requests accumulated in the command queue 32 to a sufficient amount. This can consequently reduce overhead to the execution of the access processing.

Furthermore, since the second scale provides the mode of permitting certain requesters to issue access requests without token acquisition, it is possible to save processing time and resources necessary for granting tokens.

The token acquisition is skipped when the bus bandwidths are relatively empty. The partial omission of the token-based function for arbitrating the use bus bandwidths thus has little effect. In addition, requesters of low priority must acquire tokens even when the bus bandwidths are relatively empty. This precludes such situations that access requests from those requesters concentrate to hinder the access processing of other requesters. Since the token granting processing is skipped on that basis, it is possible to reduce the overhead incurred until the execution of accesses further while ensuring the effect of the introduction of tokens. This also allows efficient use of the bus bandwidths. As in the first embodiment, the introduction of tokens also has advantages in terms of introduction cost and implementation area.

Up to this point, the present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention.

For example, the second embodiment has dealt with the case where the requesters check by themselves whether FP is granted or disabled, and determine from the result whether to request tokens to the token manager 12 or to issue access requests to the memory controller 16 and the like without requesting tokens. Alternatively, all the requesters, i.e., the first requester 30a to the nth requester 30n may once request tokens to the token manager 12 before the token manager 12 identifies which requesters are granted an FP. Here, the requesters granted an FP are given special tokens which are available all the time, so that they are permitted to issue access requests immediately. This makes it possible to provide the same effect as that of the second embodiment without modifying the operations of the first requester 30a to the nth requester 30n where FP is not introduced.

The second embodiment has also dealt with the case where two level scales, or generation levels and skip levels, are used to change the token generation rates and the requestors for which the token granting processing is skipped. Nevertheless, the skip levels alone may be introduced. Even in this case, it is possible to save processing time and resources necessary for granting tokens, thereby providing the effects of reduced overhead and the efficient use of the bus bandwidths at low cost.

What is claimed is:

1. An information processing apparatus comprising:
a plurality of requestor units which ask for permission to issue an access request to one or a plurality of resources, each single access involving transmission of data with an identical size D, and issue the access request after obtaining the permission;
an issuance rate control unit connected with the plurality of requestor units, and which receives the requests for permission to access the resources from the requestor units and grants issuance permission to the requestor units such that the access requests are issued at a rate based on an implemented bus bandwidth B of an individual bus connected to the plurality of resources; and
one or more access processing units each of which is connected with the plurality of requestor units and a respective one of the plurality of resources via the individual bus, the access processing units being provided with a command queue accumulating access requests permitted by the issuance rate control unit, and processing the permitted access requests sequentially;
wherein
when the amount of the access requests to an individual resource accumulated in the command queue in respective access processing unit is smaller than or equal to a predetermined first threshold which is a fixed value less than the command queue size, the issuance rate control unit continues to generate tokens at a rate R which exceeds a bus-bandwidth equivalent rate
(R1+R2+ . . . +Rn), where R1, R2, . . . , Rn (n=number of requestor units), are upper limits of access rate of respective requestor units via the bus connecting the access processing unit with the resource and satisfy $$(R1+R2+\ldots+Rn) \times D = B.$$

2. The information processing apparatus according to claim 1, wherein:
when the amount of accumulated access requests exceeds the first threshold, the at least one access processing unit notifies the issuance rate control unit of the excess; and
when notified, the issuance rate control unit switches processing so that the total sum of rates R at which the requestor units issue the access requests does not exceed the bus-bandwidth equivalent rate (R1+R2+ . . . +Rn).

3. The information processing apparatus according to claim 1, wherein when the amount of access requests accumulated in the at least one access processing unit is smaller than or equal to a predetermined second threshold, at least one of the requestor units issues the access request irrespective of the control by the issuance rate control unit.

4. The information processing apparatus according to claim 1, wherein:
when the amount of accumulated access requests exceeds a predetermined second threshold higher than the first threshold, the at least one access processing unit notifies the issuance rate control unit of the excess; and
the issuance rate control unit permits none of the requestor units which ask for permission during the status in which the amount of accumulated access requests exceeds the second threshold to issue an access request.

5. The information processing apparatus according to claim 1, wherein:
the requestor units are at least either a processor or an I/O device controller which controls an I/O device; and
the at least one access processing unit is at least either a memory controller which controls a memory or the I/O device controller.

6. The information processing apparatus according to claim 1, wherein the requestor units are virtual sections of a processor, the sections being allocated for respective processes to be processed by the information processing apparatus.

7. The information processing apparatus according to claim 1, wherein the buses connecting the one or more access processing units with the plurality of resources is at least one of a bus connecting a memory controller with a memory and a bus connecting an I/O device controller with an I/O device.

8. A recording medium, readable by a computer, having embodied thereon a computer program product causing the computer to perform the steps, comprising:
exercising control so that access requests to one of a plurality of resources connected via respective buses are issued from a plurality of requestor units at rates based on an implemented bus bandwidth B of the respective buses, each single access involving transmission of data with an identical size D;

accepting and accumulating in a command queue, by an access processing unit for a resource to be accessed, the access requests issued; and sequentially realizing the accumulated access requests, wherein when an amount of the access requests accumulated is smaller than or equal to a fixed predetermined value that is less than a size of the command queue, control is exercised so that tokens are generated at a rate R which exceeds a bus-bandwidth equivalent rate (R1+R2+ . . . +Rn), where R1, R2, . . . , Rn (n=number of requestor units), are respective upper limits of access rate of each of the n requestor units via the bus connecting the access processing unit with the resource and satisfy $(R1+R2+ \ldots +Rn) \times D = B.$

9. A method for providing access control, comprising:

providing a plurality of requestor units which request permission to issue access requests to one or a plurality of resources, each single access involving transmission of data with an identical size D;

receiving the request for permission from a requestor unit at an issuance rate control unit, which is separate from and connected to one or more access processing units;

granting issuance permission with the issuance rate control unit to the requestor unit such that access requests are issued at a rate based on an implemented bus bandwidth B of a respective bus connecting an access processing unit with a resource;

issuing the access request upon receiving permission from the issuance rate control unit;

accepting and accumulating permitted access requests issued by the requestor unit in a command queue with the access processing units each of which are individually connected with the plurality of resources via a respective bus; and realizing sequential accesses with the access processing unit, wherein when an amount of the access requests to an individual resource accumulated in the command queue of a respective access processing unit is smaller than or equal to a predetermined, fixed first threshold which is less than a size of the command queue, tokens are continued to be generated by the issuance rate control unit at a rate R that exceeds a bus-bandwidth equivalent rate (R1+R2+ . . . +Rn), where R1, R2, . . . , Rn (n=number of requestor units), are respective upper limits of access rate by the first requestor unit, second requestor unit, . . . , the nth requestor unit via the bus connecting the access processing unit with the resource and satisfy $(R1+R2+ \ldots +Rn) \times D = B.$

10. The method according to claim 9, further comprising:
notifying the issuance rate control unit of an excess with the access processing unit when the amount of accumulated access requests exceeds the first threshold; and
switching processing with the notified issuance rate control unit so that the total sum of rates R at which the requestor units issue the access requests does not exceed the bus-bandwidth equivalent rate (R1+R2+ . . . +Rn).

11. The method according to claim 9, further comprising:
issuing the access request with at least one of the requestor units irrespective of the control by the issuance rate control unit when the amount of access requests accumulated in the access processing unit is smaller than or equal to a predetermined second threshold.

12. The method according to claim 9, further comprising:
notifying the issuance rate control unit of the excess with the access processing unit when the amount of accumulated access requests exceeds a predetermined second threshold higher than the first threshold; and
permitting none of the requestor units which ask for permission during the status in which the amount of accumulated access requests exceeds the second threshold to issue an access request with the issuance rate control unit.

13. The method according to claim 9, wherein:
the requestor units are at least either a processor or an I/O device controller which controls an I/O device; and
the access processing unit is at least either a memory controller which controls a memory or the I/O device controller.

14. The method according to claim 9, wherein the requestor units are virtual sections of a processor, the sections being allocated for respective processes to be processed.

* * * * *